United States Patent
Wada

(10) Patent No.: US 12,515,697 B2
(45) Date of Patent: Jan. 6, 2026

(54) DETECTION OF TRAVEL LANES IN VIEW OF LANE CHANGES

(71) Applicant: HONDA MOTOR CO., LTD., Tokyo (JP)

(72) Inventor: Koichiro Wada, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 162 days.

(21) Appl. No.: 18/517,000

(22) Filed: Nov. 22, 2023

(65) Prior Publication Data

US 2024/0174258 A1    May 30, 2024

(30) Foreign Application Priority Data

Nov. 24, 2022    (JP) ................................. 2022-187200

(51) Int. Cl.
*B60W 60/00*    (2020.01)
*B60W 30/18*    (2012.01)
(Continued)

(52) U.S. Cl.
CPC .... *B60W 60/001* (2020.02); *B60W 30/18163* (2013.01); *G06T 7/74* (2017.01);
(Continued)

(58) Field of Classification Search
CPC ........ G06V 20/588; G06T 2207/30256; G08G 1/167; B60W 2552/53; B60W 30/18163
See application file for complete search history.

(56) References Cited

U.S. PATENT DOCUMENTS

2019/0102632 A1* 4/2019 Tsuchiya ............... B60W 30/12
2020/0285863 A1* 9/2020 Sadjadi .................. G08G 1/167
(Continued)

FOREIGN PATENT DOCUMENTS

JP    06-249653    9/1994
JP    2012-018132    1/2012
(Continued)

OTHER PUBLICATIONS

Japanese Office Action for Japanese Patent Application No. 2022-187200 mailed Jul. 9, 2024.

*Primary Examiner* — Kenneth J Malkowski
(74) *Attorney, Agent, or Firm* — Amin, Turocy & Watson, LLP

(57) ABSTRACT

Provided is a vehicle control device configured to: recognize a road division line existing in front of a vehicle based on an image captured by a camera; match road division line information obtained based on the recognition result with map information describing a distribution of the road division line to identify a position of the vehicle; perform travel control for the vehicle based on the matching result, in which when the vehicle has finished changing lanes from a travel lane in which the vehicle is currently traveling to an adjacent lane, the processor does not match the road division line information with the map information in a section by a predetermined distance with respect to a front-back direction of the vehicle, and matches the road division line information with the map information in such a range outside the section as to include a front-back side of the section.

10 Claims, 7 Drawing Sheets

(51) Int. Cl.
 G06T 7/73   (2017.01)
 G06V 20/56  (2022.01)
(52) U.S. Cl.
 CPC ..... G06V 20/588 (2022.01); *B60W 2420/403* (2013.01); *B60W 2420/408* (2024.01); *B60W 2552/53* (2020.02); *B60W 2556/40* (2020.02); *G06T 2207/30256* (2013.01)

(56) References Cited

U.S. PATENT DOCUMENTS

2021/0319584 A1* 10/2021 Qian ................. G06V 20/588
2025/0010844 A1*  1/2025 Takei ................. B60W 30/02

FOREIGN PATENT DOCUMENTS

| | | |
|---|---|---|
| JP | 2015-069339 | 4/2015 |
| JP | 2017-198566 | 11/2017 |
| JP | 2019-045406 | 3/2019 |
| JP | 2021-032663 | 3/2021 |

* cited by examiner

DETECTION OF TRAVEL LANES IN VIEW OF LANE CHANGES

CROSS-REFERENCE TO RELATED APPLICATION

This application is based upon and claims the benefit of priority from Japanese Patent Application No. 2022-187200, filed Nov. 24, 2022, the entire contents of which is incorporated herein by reference.

BACKGROUND

Field of the Invention

The present invention relates to a vehicle control device, a vehicle control method, and a storage medium.

Description of Related Art

A technology is known for estimating a vehicle's self-position and utilizing it for vehicle control by matching a road division line recognized by a camera with a road division line stored in map information. For example, Japanese Patent Laid-open No. 2017-198566 discloses a technique that matches a lane marker recognized by a peripheral recognition sensor with a lane marker calculated from a high-definition map to estimate the vehicle's position on the high-definition map and output vehicle position data on the high-definition map.

However, in conventional technologies, when a vehicle changes lanes, the timing is processed by a feature point of the road division line shape recognized by the camera and the map, leading to situations where the self-position cannot be accurately estimated in some cases.

SUMMARY

The present invention has been made in view of the above-mentioned circumstances, and has an object to provide a vehicle control device, a vehicle control method, and a storage medium that enables accurate estimation of the self-position of a vehicle even when the vehicle changes lanes.

A vehicle control device, vehicle control method, and storage medium according to the present invention adopt the following configuration.

(1): A vehicle control device comprising a storage medium storing computer-readable commands, and a processor connected to the storage medium, the processor being configured to execute the computer-readable commands to: recognize a road division line existing in front of a vehicle based on an image captured by a camera; match road division line information obtained based on the recognition result with map information describing a distribution of the road division line to identify a position of the vehicle along an extension direction of a road; perform travel control for the vehicle based on the matching result, in which when the vehicle has finished changing lanes from a travel lane in which the vehicle is currently traveling to an adjacent lane, the processor does not match the road division line information with the map information in a section by a predetermined distance with respect to a front-back direction of the vehicle, and matches the road division line information with the map information in such a range outside the section as to include a front-back side of the section.

(2): In the aspect (1), the processor matches, for the range outside the section in the front direction, the road division line information with the map information by using map information relating to the adjacent lane, and matches, for the range outside the section in the back direction, the road division line information with the map information by using map information relating to the travel lane.

(3): In the aspect (1), the road division line information includes forward information representing the road division line existing in the front direction, and backward information representing a sequence of points in the back direction calculated based on the forward information and a lateral position of the vehicle.

(4): In the aspect (1), the road division line information includes information generated based on a lateral distance from the road division line to a center of the vehicle.

(5): In the aspect (1), the processor acquires the map information to be used for the matching by connecting pieces of map information received from a device managing the map information a plurality of number of times.

(6): In the aspect (1), the processor acquires, for the front direction, the recognized road division line as the road division line information to be used for the matching, and acquires, for the back direction, past road division line information generated based on the road division line and information relating to the vehicle as the road division line information to be used for the matching.

(7): In the aspect (1), the processor outputs the road division line information based on the road division line and information relating to the vehicle after the vehicle has finished changing lanes and traveled by a predetermined distance.

(8): In the aspect (1), the processor performs the matching and the travel control irrespective of the type of lane change.

(9): A vehicle control method according to an aspect of the present invention is a vehicle control method to be executed by a computer, the vehicle control method comprising: recognizing a road division line existing in front of a vehicle based on an image captured by a camera; matching road division line information obtained based on the recognition result with map information describing a distribution of the road division line to identify a position of the vehicle along an extension direction of a road; and performing travel control for the vehicle based on the matching result, in which when the vehicle has finished changing lanes from a travel lane in which the vehicle is currently traveling to an adjacent lane, the road division line information is not matched with the map information in a section by a predetermined distance with respect to a front-back direction of the vehicle, and the road division line information is matched with the map information in such a range outside the section as to include a front-back side of the section.

(10): A non-transitory computer-readable storage medium according to an aspect of the present invention is a non-transitory computer-readable storage medium storing a program for causing a computer to: recognize a road division line existing in front of a vehicle based on an image captured by a camera; match road division line information obtained based on the recognition result with map information describing a distribution of the road division line to identify a position of the vehicle along an extension direction of a road; and perform travel control for the vehicle based on the matching result, in which when the vehicle has finished changing lanes from a travel lane in which the vehicle is currently traveling to an adjacent lane, the road division line information is not matched with the map information in a section by a predetermined distance with respect to a front-back direction of the vehicle, and the road division line information is matched with the map information in such a range outside the section as to include a front-back side of the section.

According to the aspects (1) to (10), it is possible to accurately estimate the self-position of a vehicle even when the vehicle changes lanes.

DESCRIPTION OF EMBODIMENTS

Now, a vehicle control device, a vehicle control method, and a storage medium according to an embodiment of the present invention are described with reference to the drawings.

[Overall Configuration]

Figure 1:
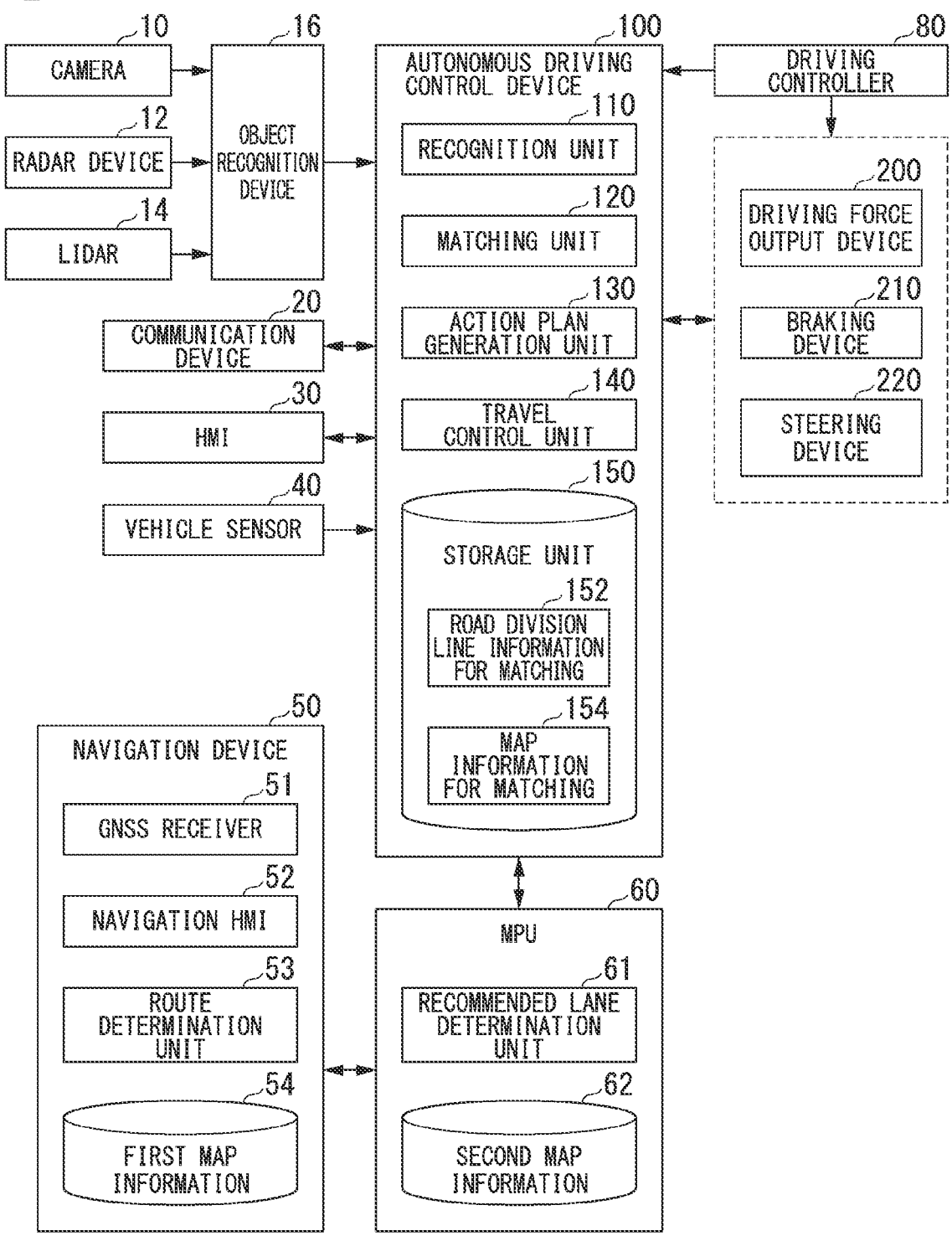
FIG. 1 is a configuration diagram of a vehicle system that uses a vehicle control device according to an embodiment.

FIG. 1 is a configuration diagram of a vehicle system 1 that uses a vehicle control device according to an embodiment. A vehicle including the vehicle system 1 is, for example, a vehicle such as a two-wheeled vehicle, a three-wheeled vehicle, or a four-wheeled vehicle, and its power source is an internal combustion engine such as a diesel engine or a gasoline engine, an electric motor, or a combination thereof. The electric motor operates by using power generated by a generator connected to the internal combustion engine or power discharged by a secondary battery or a fuel cell.

The vehicle system 1 includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, an MPU (Map Positioning Unit) 60, a driving control unit 80, an autonomous driving control device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added.

The camera 10 is, for example, a digital camera that uses a solid image pickup device such as a CCD (Charge Coupled Device) or a CMOS (Complementary Metal Oxide Semiconductor). The camera 10 is mounted on any part of a vehicle (hereinafter referred to as "subject vehicle M") including the vehicle system 1. When the camera 10 picks up a front image, the camera 10 is mounted on, for example, an upper part of a front windshield or a back surface of a rear-view mirror. The camera 10 repeatedly photographs the surroundings of the subject vehicle M periodically, for example. The camera 10 may be a stereo camera.

The radar device 12 radiates a radio wave such as a millimeter wave toward the surroundings of the subject vehicle M, and detects a radio wave (reflected wave) reflected by an object, to detect at least the position (distance and direction) of the object. The radar device 12 is mounted on any part of the subject vehicle M. The radar device 12 may detect the position and speed of the object by an FM-CW (Frequency Modulated Continuous Wave) method.

The LIDAR 14 radiates light (or electromagnetic wave having a wavelength close to light) toward the surroundings of the subject vehicle M, and measures diffused light. The LIDAR 14 detects a distance to a target based on a period of time since emission of light until reception of light. The light to be radiated is, for example, pulsed laser light. The LIDAR 14 is mounted on any part of the subject vehicle M.

The object recognition device 16 executes sensor fusion processing for results of detection by a part or all of the camera 10, the radar device 12, and the LIDAR 14, to thereby recognize a position, a type, and a speed of an object, for example. The object recognition device 16 outputs the recognition result to the autonomous driving control device 100. The object recognition device 16 may output the results of detection by the camera 10, the radar device 12, and the LIDAR 14 to the autonomous driving control device 100 as they are.

The communication device 20 uses, for example, a cellular network, a Wi-Fi network, Bluetooth (trademark), or DSRC (Dedicated Short Range Communication) to communicate with another vehicle existing near the subject vehicle M or communicate with various kinds of server devices via a radio base station.

The HMI 30 presents various kinds of information to an occupant of the subject vehicle M, and receives input of an operation by the occupant. The HMI includes, for example, various kinds of display devices, speakers, buzzers, touch panels, switches, and keys.

The vehicle sensor 40 includes, for example, a vehicle speed sensor that detects a speed of the subject vehicle M, an acceleration sensor that detects an acceleration, a yaw rate sensor that detects an angular speed with respect to a vertical axis, and an orientation sensor that detects an orientation of the subject vehicle M.

The navigation device 50 includes, for example, a GNSS (Global Navigation Satellite System) receiver 51, a navigation HMI 52, and a route determination unit 53. The navigation device 50 holds first map information 54 in a storage device such as an HDD (Hard Disk Drive) or a flash memory. The GNSS receiver 51 identifies the position of the subject vehicle M based on a signal received from a GNSS satellite. The position of the subject vehicle M may be identified or complemented by an INS (Inertial Navigation System) that uses output of the vehicle sensor 40. The navigation HMI 52 includes, for example, a display device, a speaker, a touch panel, and a key. The navigation HMI 52 and the HMI 30 described above may be integrated partially or completely. The route determination unit 53 refers to the first map information 54 to determine a route (hereinafter referred to as "map route") from the position (or any input position) of the subject vehicle M identified by the GNSS receiver 51 to a destination input by an occupant by using the navigation HMI 52, for example. The first map information 54 is, for example, information representing road structure by a link indicating a road and nodes connected by the link. The first map information 54 may include, for example, a curvature of a road and POI (Point Of Interest) information. The map route is output to the MPU 60. The navigation device 50 may guide a route by using the navigation HMI 52 based on the map route. The navigation device 50 may be implemented by, for example, the function of a terminal device such as a smartphone or a tablet terminal held by the occupant. The navigation device 50 may transmit the current position and the destination to a navigation server via the communication device 20, and acquire a route similar to the map route from the navigation server.

The MPU 60 includes, for example, a recommended lane determination unit 61, and holds second map information 62 in a storage device such as an HDD or a flash memory. The recommended lane determination unit 61 divides the map route provided by the navigation device 50 into a plurality of blocks (for example, at intervals of 100 [m] with respect to a vehicle travel direction), and determines a recommended route for each block with reference to the second map information 62. The recommended lane determination unit 61 determines on which lane the subject vehicle M is to travel. When there is a junction on a map route, the recommended lane determination unit 61 determines a recommended route so that the subject vehicle M can travel on a route for efficiently entering the junction. Additionally, the MPU 60 has the capability to extract information within a specified range from the second map information 62 and transmit the information to the autonomous driving control device 100 in response to a request from the autonomous driving control device 100.

The second map information 62 is map information having higher precision than that of the first map information 54. The second map information 62 includes, for example, information on the center of a lane or information on the boundary of a lane. The second map information 62 may further include, for example, road information, traffic regulation information, address information (address or postal code), facility information, and phone number information. The second map information 62 may be updated appropriately through communication between the communication device 20 and another device.

The driving control unit 80 includes, for example, an acceleration pedal, a brake pedal, a gear shift, and a steering wheel, a deformed steering wheel, a joystick, and other input devices, for example. A sensor that detects an operation amount or whether an operation is applied is mounted on the driving control unit 80, and the detection result is output to the autonomous driving control device 100 or a part or all of the driving force output device 200, the braking device 210, and the steering device 220.

The autonomous driving control device 100 includes, for example, a recognition unit 110, a matching unit 120, an action plan generation unit 130, a travel control unit 140, and a storage unit 150. The recognition unit 110, the matching unit 120, the action plan generation unit 130, and the travel control unit 140 are each implemented by a hardware processor such as a CPU (Central Processing Unit) executing a program (software). A part or all of the components may be implemented by hardware (circuit: including circuitry) such as an LSI (Large Scale Integration), an ASIC (Application Specific Integrated Circuit), an FPGA (Field-Programmable Gate Array), or a GPU (Graphics Processing Unit), or may be implemented by cooperation between software and hardware. The program may be stored in advance in a storage device (storage device including a non-transitory storage medium) of the autonomous driving control device 100 such as an HDD or a flash memory, or the program may be stored in a removable storage medium such as a DVD or a CD-ROM. Then, the storage medium (non-transitory storage medium) may be mounted on a drive device so that the program is installed into an HDD or a flash memory of the driving assistance device 100. The storage unit 150 stores, for example, road division line information for matching 152 and map information for matching 154.

The storage unit 150 is implemented by, for example, a ROM (Read Only Memory), a flash memory, an SD card, a RAM (Random Access Memory), an HDD (Hard Disk Drive), a register, or the like. The autonomous driving control device 100 is an example of "vehicle control device".

The recognition unit 110 recognizes states such as the position, speed, and acceleration of an object near the subject vehicle M based on information input from the camera 10, the radar device 12, and the LIDAR 14 via the object recognition device 16. The position of an object is, for example, recognized as a position in an absolute coordinate system with respect to a representative point (for example, center of gravity or center of drive axis) of the subject vehicle M to be used for control. The position of an object may be represented by a representative point such as a center of gravity or corner of the object, or may be represented by a region. The "state" of an object may include the acceleration, jerk, or "action state" (for example, whether or not the subject vehicle M is changing a lane or is trying to change a lane) of the object.

The recognition unit 110 recognizes, for example, a lane (travel lane) on which the subject vehicle M is traveling. For example, the recognition unit 110 uses an image photographed by the camera 10 to recognize a road division line included in the image as the travel lane. The recognition unit 110 can recognize the road division line by using a trained model that is trained to receive input of an image photographed by the camera 10 to extract the road division line included in the image. In addition to the road division line, the recognition unit 110 may recognize the travel lane by recognizing a travel path boundary (road boundary) including, for example, a road division line, the shoulder of a road, a curb, a center median, and a guardrail. In this recognition, the position of the subject vehicle M acquired from the navigation device 50 or the result of processing by the INS may be considered. The recognition unit 110 recognizes a stop line, an obstacle, red light, a toll gate, and other road events.

The recognition unit 110 recognizes the position or posture of the subject vehicle M with respect to a travel lane when recognizing the travel lane. The recognition unit 110 may recognize, for example, as the relative position and posture of the subject vehicle M with respect to the travel lane, a deviation of the reference point of the subject vehicle M from the center of the lane and an angle with respect to a line obtained by connecting the centers of the lane in the travel direction of the subject vehicle M. Instead, the recognition unit 110 may recognize, for example, the position of the reference point of the subject vehicle M with respect to any side edge (road division line or road boundary) of the travel lane as the relative position of the subject vehicle M with respect to the travel lane. The matching unit 120 is described later in detail.

The matching unit 120 executes matching described later based on the road division line recognized by the recognition unit 110 and the second map information 62 to identify the position (current position) of the subject vehicle M. Details of the matching unit 120 are described later.

The action plan generation unit 130 generates a target trajectory in which the subject vehicle M is to travel in the future (without depending on an operation performed by the driver) autonomously so as to be capable of traveling on a recommended lane determined by the recommended lane determination unit 61 in principle and coping with the surrounding situation of the subject vehicle M. The target trajectory includes, for example, a speed component, and is generated with the position of the subject vehicle M identified by the matching unit 120 serving as a starting point. For example, the target trajectory is represented by arranging the locations (trajectory points) to be reached by the subject vehicle M. The trajectory points are locations to be reached by the subject vehicle M at predetermined travelled distances (for example, about several meters) along the road. In addition, a target speed and a target acceleration are generated in each predetermined sampling period (for example, less than 1 second) as a part of the target trajectory. The trajectory points may be positions to be reached by the subject vehicle M in each sampling period. In this case, information on the target speed and the target acceleration is represented by an interval between trajectory points.

The travel control unit 140 controls the driving force output device 200, the braking device 210, and the steering device 220 so that the subject vehicle M passes through the target trajectory generated by the action plan generation unit 140 as scheduled.

The travel control unit 140 acquires information on a target trajectory (trajectory points) generated by the action plan generation unit 130, and stores the information into a memory (not shown). The travel control unit 140 controls the driving force output device 200 or the braking device 210 based on a speed component accompanying the target trajectory stored in the memory. The travel control unit 140 controls the steering device 220 depending on the degree of curve of the target trajectory stored in the memory. The processing of the travel control unit 140 is implemented by a combination of feed-forward control and feedback control. As an example, the travel control unit 140 executes feed-forward control that depends on the curvature of the road in front of the subject vehicle M and feedback control based on a deviation from the target trajectory.

The driving force output device 200 outputs, to a drive wheel, a traveling driving force (torque) for causing the subject vehicle M to travel. The driving force output device 200 includes, for example, a combination of an internal combustion engine, an electric motor, and a transmission, and an ECU (Electronic Control Unit) configured to control these components. The ECU controls the above-mentioned components in accordance with information input from the travel control unit 140 or information input from the driving control unit 80.

The braking device 210 includes, for example, a brake caliper, a cylinder that transmits a hydraulic pressure to the brake caliper, an electric motor that causes the hydraulic pressure in the cylinder, and a brake ECU. The brake ECU controls the electric motor in accordance with information input from the second controller 160 or information input from the driving control unit 80, and causes a brake torque that depends on a braking operation to be output to each wheel. The braking device 210 may include, as a backup, a mechanism for transmitting the hydraulic pressure, which is caused by an operation of the brake pedal included in the driving control unit 80, to the cylinder via a master cylinder. The configuration of the braking device 210 is not limited to the configuration described above, and the braking device 210 may be an electronic hydraulic brake device configured to control an actuator in accordance with information input from the second controller 160, and transmit the hydraulic pressure of the master cylinder to the cylinder.

The steering device 220 includes, for example, a steering ECU and an electric motor. The electric motor causes a force in a rack-and-pinion mechanism to change the orientation of a steered wheel. The steering ECU drives the electric motor in accordance with information input from the travel control unit 140 or information input from the driving control unit 80 to change the orientation of the steered wheel.

[Processing of Matching Unit]

The matching unit 120 matches the road division line information for matching 152 based on the road division line recognized by the recognition unit 110 with the map information for matching 154 extracted from the second map information 62 of the MPU 60, and identifies the position (more specifically, position on second map information 62) of the subject vehicle M along the extension direction (longitudinal direction) of the travel lane. The matching is repeatedly executed at predetermined control cycles (for example, milliseconds).

Figure 2:
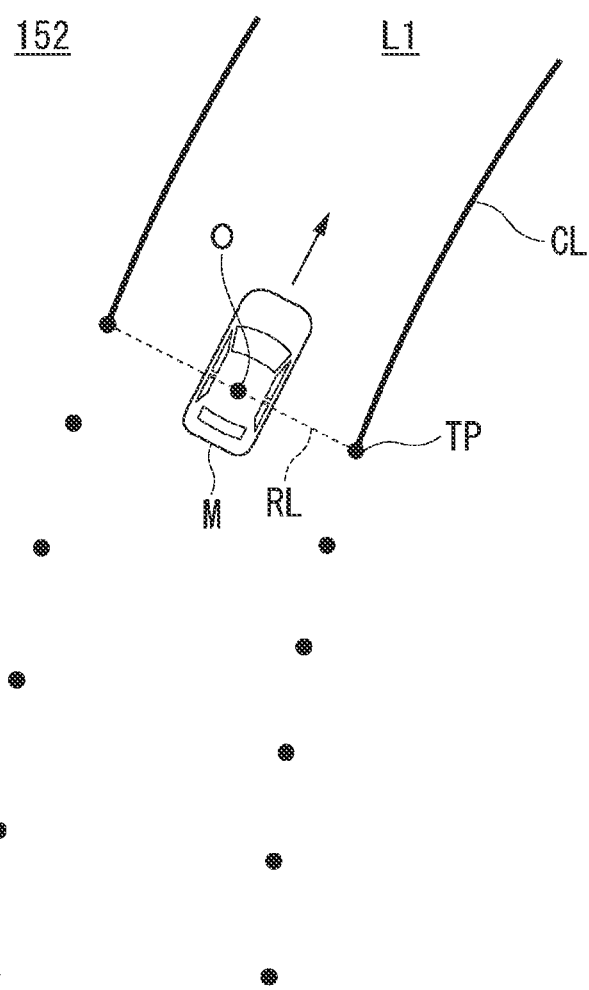
FIG. 2 is a diagram illustrating an example of road division line information for matching.

FIG. 2 is a diagram illustrating an example of the road division line information for matching 152. FIG. 2 illustrates a situation in which the subject vehicle M is traveling along a lane L1 (hereinafter referred to as "camera road division line CL"), which is recognized based on the image captured by the camera 10. The matching unit 120 first acquires the camera road division line CL, which is recognized by the recognition unit 110 and exists in the front direction of the subject vehicle M (for example, on the direction of travel with the center O of gravity of the subject vehicle M serving as the starting point), and stores the camera rfoad division line CL as the road division line information for matching 152. Furthermore, the matching unit 120 acquires intersections between the reference line RL, which extends laterally with the center O of gravity of the subject vehicle M serving as the reference, and the camera road division line CL as trajectory points TP, and stores the trajectory points TP as the road division line information for matching 152 in the back direction of the subject vehicle M. In more detail, the matching unit 120 samples and buffers the lateral positions of the subject vehicle M along the recognized camera road division line CL recognized by the recognition unit 110 using coordinate transformation based on the amount of movement of the subject vehicle M, to extend the trajectory points TP in the back direction of the subject vehicle M for storage into the road division line information for matching 152. In this way, the matching unit 120 acquires the camera road division line CL (example of "forward information") recognized by the recognition unit 110 for the front direction of the subject vehicle M, and acquires the trajectory points TP (example of "backward information"), which are generated based on the lateral distance of the subject vehicle M, in the back direction and stores them.

In the description given above with reference to FIG. 2, the matching unit 120 defines, as the front direction of the subject vehicle M, the travel direction side of the subject vehicle M with the center O of gravity of the subject vehicle M serving as the reference, and defines, as the trajectory points TP, intersections between the camera road division line CL and the reference line RL extending in the lateral direction with the center O of gravity of the subject vehicle M serving as the starting point. However, the present invention is not limited to such a configuration, and the matching unit 120 may set any position on the subject vehicle M as a reference point instead of the center O of gravity of the subject vehicle M, and define the front direction of the subject vehicle M or acquire the trajectory points TP accordingly.

Figure 3:
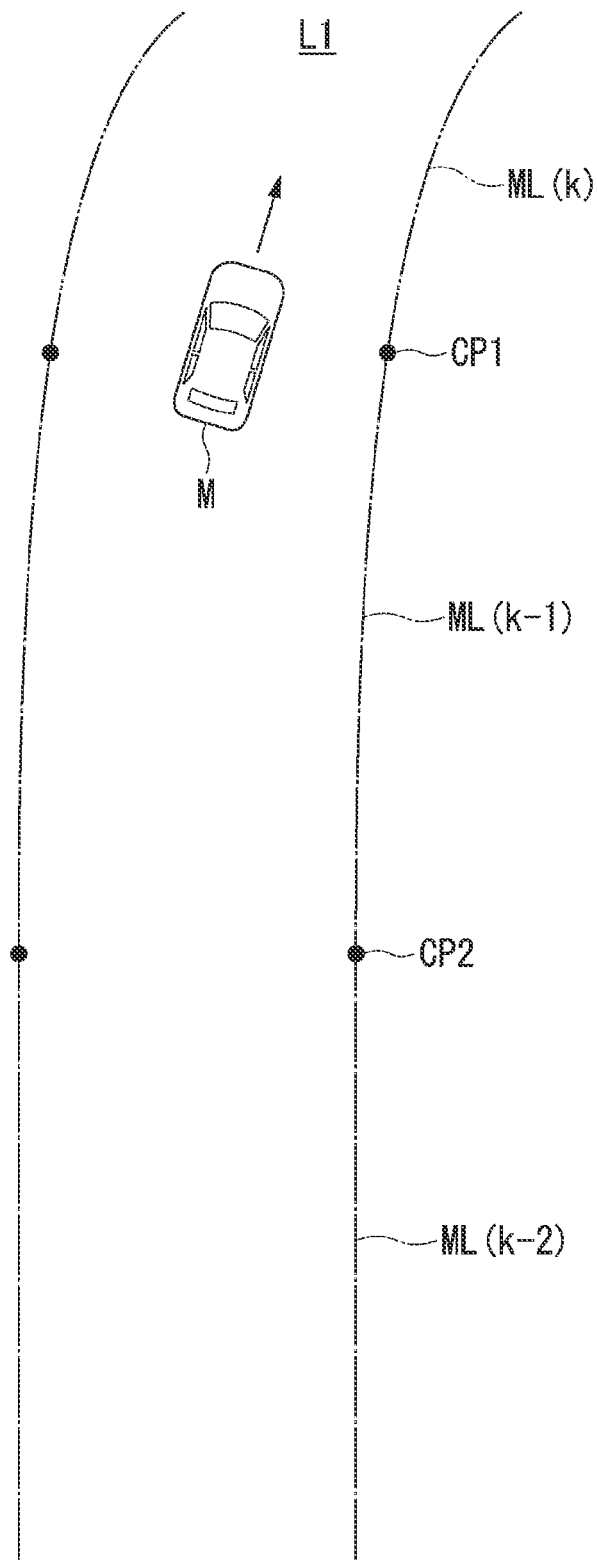
FIG. 3 is a diagram illustrating an example of map information for matching.

FIG. 3 is a diagram illustrating an example of the map information for matching 154. Similarly to FIG. 2, FIG. 3 represents a situation in which the subject vehicle M is traveling on the lane L1. The matching unit 120 requests the MPU 60 to provide information (road division line information) within a predetermined range from the second map information 62 and receives the information from the MPU 60. Here, the predetermined range represents a range including at least the current position of the subject vehicle M. The matching unit 120 transmits the position information of the subject vehicle M, which is identified based on signals received from GNSS satellites, to the MPU 60, and the MPU 60, upon receiving the position information, uses the received position information as a key to refer to the second map information 62. The MPU 60 then acquires the information within the predetermined range, and transmits the information to the autonomous driving control device 100.

While the subject vehicle M is traveling, the matching unit 120 acquires the map information for matching 154 by concatenating pieces of information within a predetermined range, which are received multiple times, at specific control cycles. These control cycles may be identical to the matching control cycle or even finer-grained, depending on the situation. For example, as illustrated in FIG. 3, the matching unit 120 acquires a map division line ML(k−2) in the k−2th cycle of control, and then, in the subsequent k−1th cycle, when a map division line ML(k−1) is acquired, the matching unit 120 connects map division lines ML(k−2) and ML(k−1) to acquire the map information for matching 154. After that, in the next k-th control cycle, when a map division line ML(k) is acquired, the matching unit 120 updates the map information for matching 154 by connecting the map division line ML(k) with the map information for matching 154 acquired since the last cycle. In this manner, the matching unit 120 updates the map information for matching 154 by connecting the map division lines ML received from the MPU 60. The matching unit 120 holds the map information for matching 154, which is obtained by connecting the map division lines ML(k), by a predetermined distance in the back direction of the subject vehicle M for matching. In this manner, it is possible to reduce the communication load on the autonomous driving control device 100 and the MPU 60 by receiving and connecting pieces of map road division line information in a predetermined range over a plurality of cycles to acquire the map information for matching 154 without receiving pieces of map information for matching 154 from the MPU 60 all at once.

Figure 4:
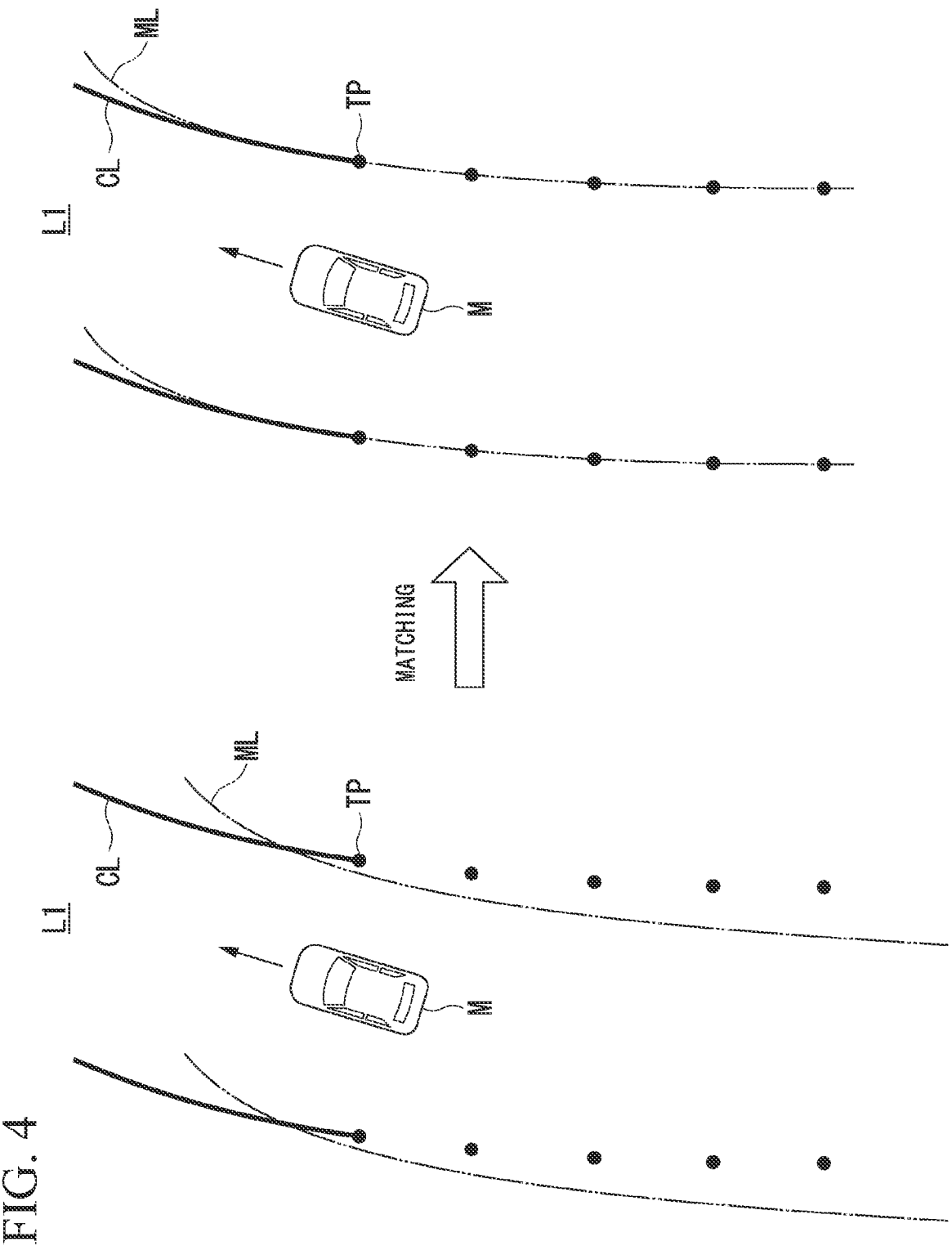
FIG. 4 is a diagram illustrating an example of matching to be executed by a matching unit.

FIG. 4 is a diagram illustrating an example of matching to be executed by the matching unit 120. In FIG. 4, the symbol ML represents a map division line obtained by connecting map division lines ML(k) by a predetermined distance (or a predetermined cycle) in the back direction of the subject vehicle M. As shown in FIG. 4, the matching unit 120 calculates an error between: the trajectory points TP and camera road division line CL included in the road division line information for matching 152; and the map division line ML included in the map information for matching 154 by any known technique to perform matching so as to minimize the calculated error. For example, the left side of FIG. 4 illustrates a situation where the error between: the trajectory points TP and camera road division line CL; and the map section lines ML occurs with respect to the travel direction of the subject vehicle M. For example, the matching unit 120 executes matching in consideration of the amount of movement of the subject vehicle M in the travel direction of the subject vehicle M to minimize the error as illustrated in the right part of FIG. 4. The matching unit 120 identifies, as the current position of the subject vehicle M, the position of the subject vehicle M on the second map information 62 at a time when the error is minimized. At this time, the matching unit 120 can also correct the position information on the subject vehicle M, which is identified based on signals received from GNSS satellites, with respect to the longitudinal direction of the subject vehicle M by using the current position identified by matching. In this manner, it is possible to improve the accuracy of satellite positioning and effectively utilize the position information for autonomous travel control.

[Processing at Time of Lane Change]

As described above, while the subject vehicle M is traveling, the matching unit 120 matches the road division line information for matching 152 with the map information for matching 154 to identify the position of the subject vehicle M, the action plan generation unit 110 generates a target trajectory with the identified current position of the subject vehicle M serving as the starting point, and the travel control unit 140 causes the subject vehicle M to travel along the generated target trajectory. However, such a matching technique is effective when the subject vehicle M is traveling along a single lane, but when the subject vehicle M changes lanes, matching may fail due to, for example, failure to recognize the camera road division line CL or difficulty in matching, with actual behavior, the timing of switching the road division line to be referred to for matching. In the following, processing to be executed by the matching unit 120 when the subject vehicle M changes lanes is described.

Figure 5:
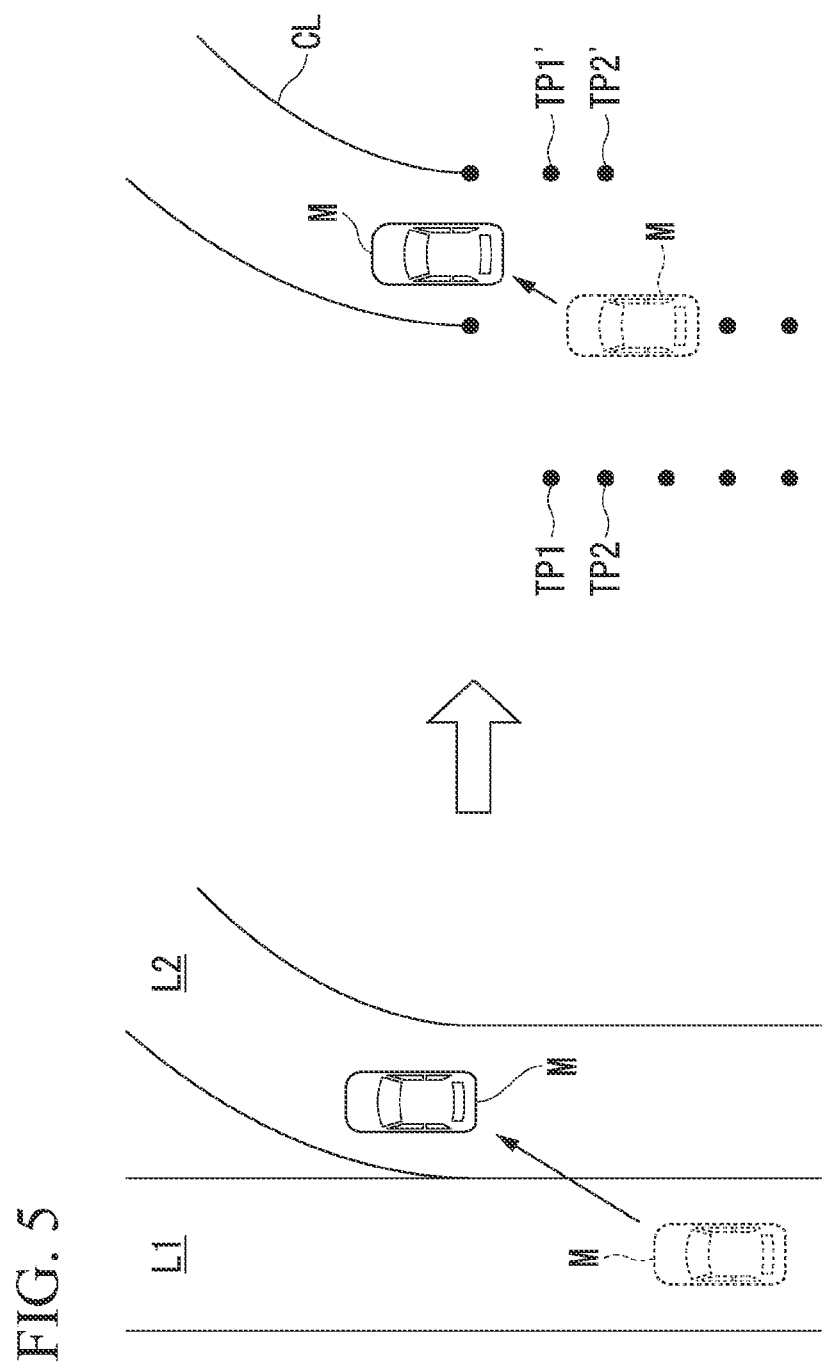
FIG. 5 is a diagram illustrating an example of a camera road division line CL and a trajectory point TP acquired when a subject vehicle M changes lanes.

FIG. 5 is a diagram illustrating an example of the camera road division line CL and the trajectory points TP acquired when the subject vehicle M changes lanes. The left part of FIG. 5 represents the situation where the subject vehicle M is changing lanes from the travel lane L1 to the adjacent lane L2. The right part of FIG. 5 shows the camera road division line CL and the trajectory points TP acquired during the lane change from the travel lane L1 to the adjacent lane L2. As shown in the right part of FIG. 5, when the subject vehicle M changes lanes, the subject vehicle M crosses the road division line, which serves as the boundary between the travel lane L1 and the adjacent lane L2. In this case, the crossed road division line may not appear in the camera image, leading to possible recognition failures by the recognition unit 110. For example, the matching unit 120 may execute matching by recognizing a combination of the trajectory point TP1 and the trajectory point TP1' as a single lane, and a combination of the trajectory point TP2 and the trajectory point TP2' as a single lane, resulting in a failure of matching.

In view of the above-mentioned circumstances, when the subject vehicle M has finished changing lanes, the matching unit 120 does not match the road division line information for matching 152 with map information for matching 154 in a section by a predetermined distance with respect to a front-back direction of the subject vehicle M, and matches the road division line information for matching 152 with the map information for matching 154 in such a range outside the section as to include the front-back side of the section. The matching unit 120 determines that the subject vehicle M has finished changing lanes if the subject vehicle M is located at the center or near the center of the adjacent lane L2, for example.

Figure 6:
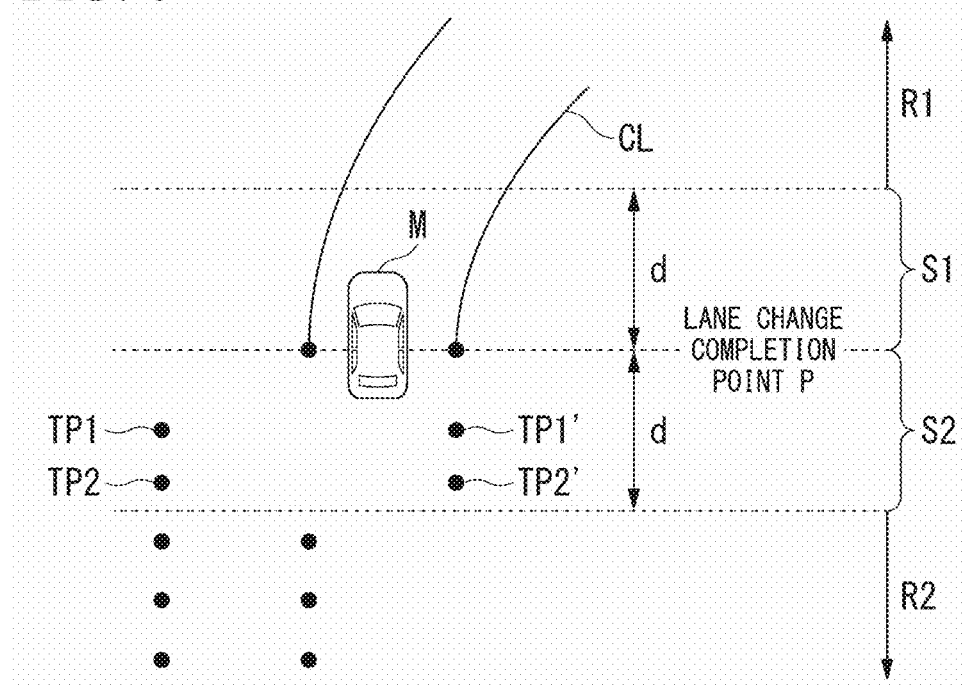
FIG. 6 is a diagram illustrating an example of processing to be executed by the matching unit when the subject vehicle M changes lanes.

FIG. 6 is a diagram illustrating an example of processing to be executed by the matching unit 120 when the subject vehicle M changes lanes. As illustrated in FIG. 6, when determining that the subject vehicle M has finished changing lanes, the matching unit 120 excludes, from the target of matching, the road division line information for matching 152 and the map information for matching 154 in a section (e.g., section S1 in the front direction and section S2 in the back direction) by a predetermined distance d with respect to the front-back direction of the subject vehicle M with the point of determination (hereinafter referred to as "lane change completion point P") serving as a reference. In the case of FIG. 6, the matching unit 120 excludes the above-mentioned trajectory points TP1, TP1', TP2, TP2' from the target of matching. In this manner, the matching unit 120 can execute matching by using only the normally acquired road division line information for matching 152 and map information for matching 154 (e.g., road division line information for matching 152 and map information for matching 154 in ranges R1 and R2 in FIG. 6). That is, it is possible to accurately estimate the self-position of a vehicle even when the vehicle changes lanes.

In the example of the description given above, the matching unit 120 continuously acquires the road division line information for matching 152 and the map information for matching 154 while the subject vehicle M is traveling. However, the present invention is not limited to such a configuration, and the matching unit 120 may temporarily stop acquisition of the road division line information for matching 152 when the subject vehicle M changes lanes. In that case, after the subject vehicle M has finished changing lanes and traveled by a predetermined distance, the matching unit 120 may restart acquisition of the road division line information for matching 152 and output the road division line information for matching 152.

Further, in the example of the description given above, the present invention is applied to the case in which the subject vehicle M travels autonomously. However, the present invention is not limited to such a configuration, and the present invention can also be applied to the case where the occupant of the subject vehicle M performs manual driving. In that case, for example, the occupant can utilize the position information for his or her own driving through display of the accurate position of the subject vehicle M identified by the matching unit 120 on the HMI 52. Furthermore, the present invention can identify the position of the subject vehicle M by matching irrespective of in which type of mode, such as autonomous driving level, the lane change has been executed.

[Flow of Processing]

Figure 7:
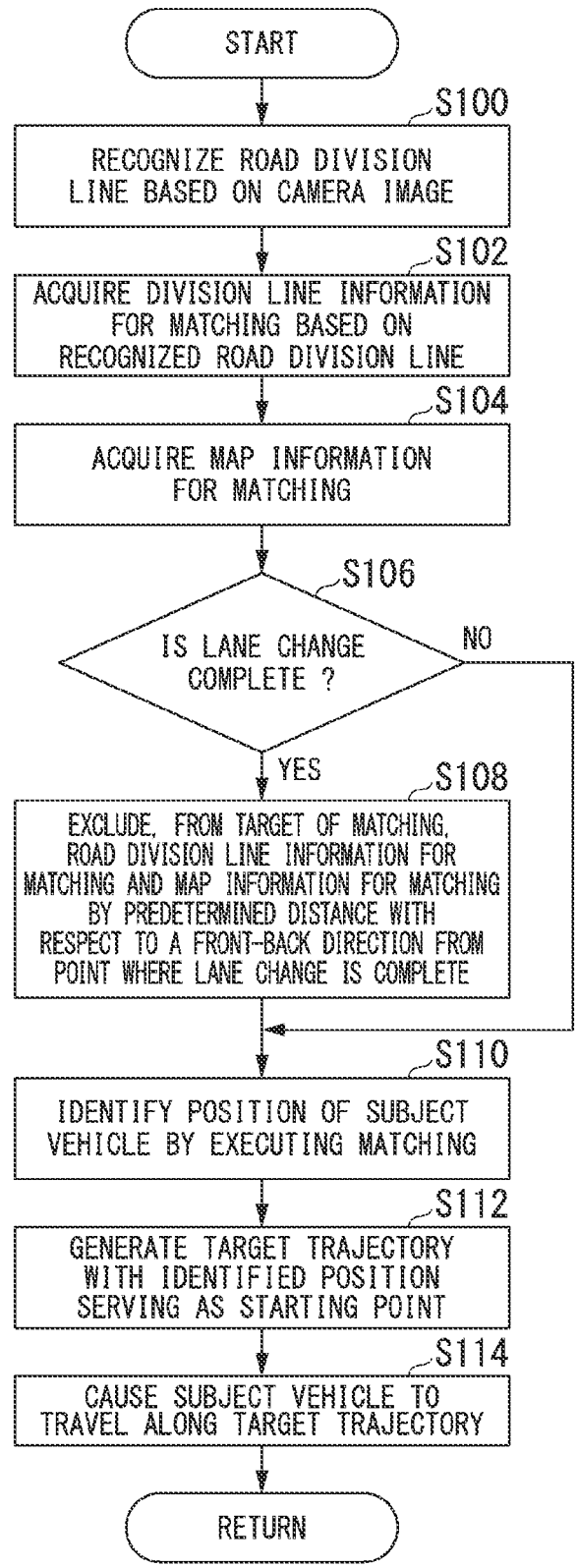
FIG. 7 is a flow chart illustrating an exemplary flow of processing to be executed by a vehicle control device according to an embodiment.

Next, description is given of a flow of processing to be executed by a vehicle control device with reference to FIG. 7. FIG. 7 is a flow chart illustrating an exemplary flow of processing to be executed by the vehicle control device according to an embodiment. The processing of this flow chart is executed repeatedly while the subject vehicle M is traveling.

First, the recognition unit 110 recognizes the road division line CL based on an image photographed by the camera 10 (Step S100). Next, the matching unit 120 acquires the road division line information for matching 152 based on the recognized road division line CL (Step S102). Next, the matching unit 120 refers to the second map information 62 by using, as a key, the position information on the subject vehicle M identified based on signals received from GNSS satellites to acquire the map information for matching 154 relating to the surroundings of the subject vehicle M (Step S104).

Next, the matching unit 120 determines whether or not the subject vehicle M has finished changing lanes (Step S106). When it is determined that the subject vehicle M has finished changing lanes, the matching unit 120 excludes, from the target of matching, the road division line information for matching 152 and the map information for matching 154 by a predetermined distance with respect to a front-back direction from a point where the subject vehicle M has finished changing lanes (Step S108). Next, the matching unit 120 matches the road division line information for matching 152 with the map information for matching 154 to identify the position of the subject vehicle M (Step S110).

Next, the action plan generation unit 110 generates a target trajectory with the identified position of the subject vehicle M serving as a starting point (Step S112). Next, the travel control unit 140 causes the subject vehicle M to travel along the generated target trajectory. The processing of this flow chart is finished in this manner.

According to the embodiment described above, when the vehicle has finished changing lanes from the trave lane in which the vehicle is traveling currently to the adjacent lane, the road division line information and the map information are not matched in a section by a predetermined distance with respect to the front-back direction of the vehicle, and the road division line information and the map information are matched in such a range outside the section as to include the front-back side of the section. As a result, it is possible to accurately estimate the self-position of a vehicle even when the vehicle changes lanes.

The embodiment described above can be represented in the following manner.

A vehicle control device including a storage medium storing computer-readable commands, and a processor connected to the storage medium, the processor being configured to execute the computer-readable commands to:

recognize a road division line existing in front of a vehicle based on an image captured by a camera;

match road division line information obtained based on the recognition result with map information describing a distribution of the road division line to identify a position of the vehicle along an extension direction of a road;

perform travel control for the vehicle based on the matching result, in which when the vehicle has finished changing lanes from a travel lane in which the vehicle is currently traveling to an adjacent lane, the processor does not match the road division line information with the map information in a section by a predetermined distance with respect to a front-back direction of the vehicle, and matches the road division line information with the map information in such a range outside the section as to include a front-back side of the section.

This concludes the description of the embodiment for carrying out the present invention. The present invention is not limited to the embodiment in any manner, and various kinds of modifications and replacements can be made within a range that does not depart from the gist of the present invention.

What is claimed is:

1. A vehicle control device comprising a storage medium storing computer-readable commands, and a processor connected to the storage medium, the processor being configured to execute the computer-readable commands to:

recognize a road division line existing in front of a vehicle based on an image captured by a camera;

match road division line information obtained based on the recognition result with map information describing a distribution of the road division line to identify a position of the vehicle along an extension direction of a road;

perform travel control for the vehicle based on the matching result, wherein the processor performs matching control of, in response to the vehicle having finished changing lanes from a travel lane in which the vehicle is currently traveling to an adjacent lane, not matching the road division line information with the map information in a first section extending a predetermined distance from a lane change completion point in a front direction of the vehicle, and in a second section extending the predetermined distance from the lane change completion point in a back direction of the vehicle, and matching the road division line information with the map information in a first range extending from the first section in the front direction of the vehicle, and in a second range extending from the first section in the back direction of the vehicle.

2. The vehicle control device according to claim 1, wherein the processor matches, for the first range, the road division line information with the map information by using map information relating to the adjacent lane, and matches, for the second range, the road division line information with the map information by using map information relating to the travel lane.

3. The vehicle control device according to claim 1, wherein the road division line information includes forward information representing the road division line existing in the front direction, and backward information representing a sequence of points in the back direction calculated based on the forward information and a lateral position of the vehicle.

4. The vehicle control device according to claim 1, wherein the road division line information includes information generated based on a lateral distance from the road division line to a center of the vehicle.

5. The vehicle control device according to claim 1, wherein the processor acquires the map information to be used for the matching by connecting pieces of map information received from a device managing the map information a plurality of number of times.

6. The vehicle control device according to claim 1, wherein the processor acquires, for the front direction, the recognized road division line as the road division line information to be used for the matching, and acquires, for the back direction, past road division line information generated based on the road division line and information relating to the vehicle as the road division line information to be used for the matching.

7. The vehicle control device according to claim 1, wherein the processor outputs the road division line information based on the road division line and information relating to the vehicle after the vehicle has finished changing lanes and traveled by the predetermined distance.

8. The vehicle control device according to claim 1, wherein the processor performs the matching control and the travel control irrespective of a type of lane change.

9. A vehicle control method to be executed by a computer, the vehicle control method comprising:

recognizing a road division line existing in front of a vehicle based on an image captured by a camera;

matching road division line information obtained based on the recognition result with map information describing a distribution of the road division line to identify a position of the vehicle along an extension direction of a road; and performing travel control for the vehicle based on the matching result, wherein, in response to the vehicle having finished changing lanes from a travel lane in which the vehicle is currently traveling to an adjacent lane, the road division line information is not matched with the map information in a first section extending a predetermined distance from a lane change completion point in a front direction of the vehicle, and in a second section extending the predetermined distance from the lane change completion point in a back direction of the vehicle, and the road division line information is matched with the map information in a first range extending from the first section in the front direction of the vehicle, and in a second range extending from the first section in the back direction of the vehicle.

10. A non-transitory computer-readable storage medium storing a program for causing a computer to:

recognize a road division line existing in front of a vehicle based on an image captured by a camera;

match road division line information obtained based on the recognition result with map information describing a distribution of the road division line to identify a position of the vehicle along an extension direction of a road; and perform travel control for the vehicle based on the matching result, wherein, in response to the vehicle having finished changing lanes from a travel lane in which the vehicle is currently traveling to an adjacent lane, the road division line information is not matched with the map information in a first section extending a predetermined distance from a lane change completion point in a front direction of the vehicle, and in a second section extending the predetermined distance from the lane change completion point in a back direction of the vehicle, and the road division line information is matched with the map information in a first range extending from the first section in the front direction of the vehicle, and in a second range extending from the first section in the back direction of the vehicle.

* * * * *